Figure 1:
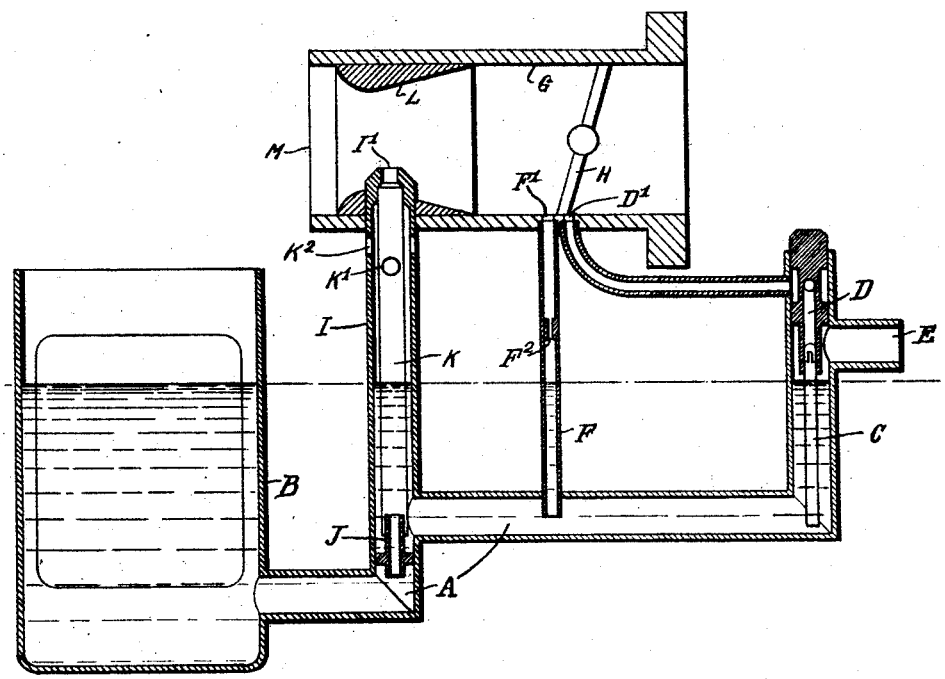

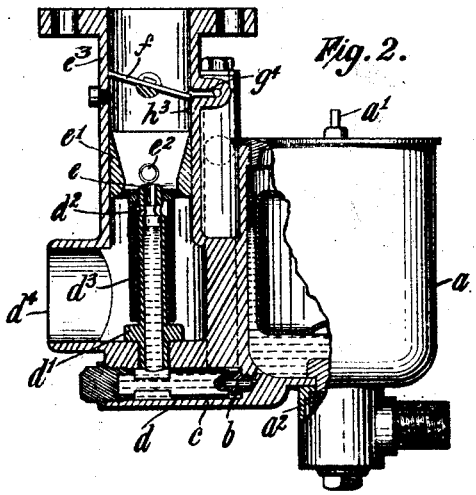
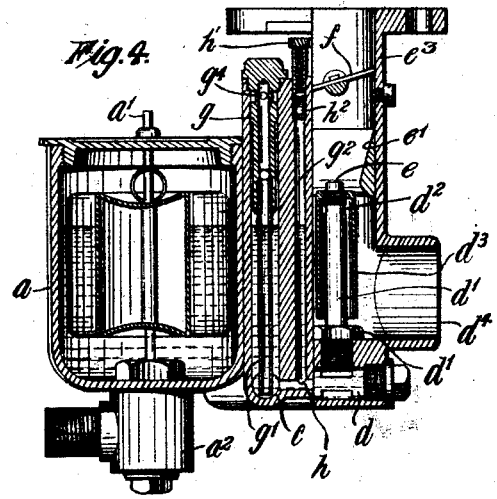
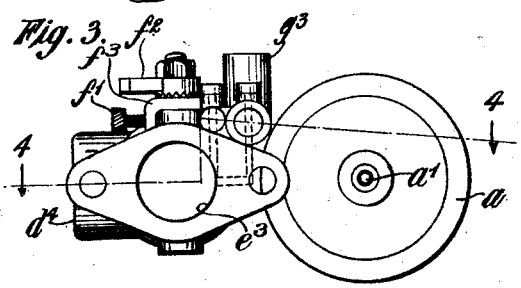

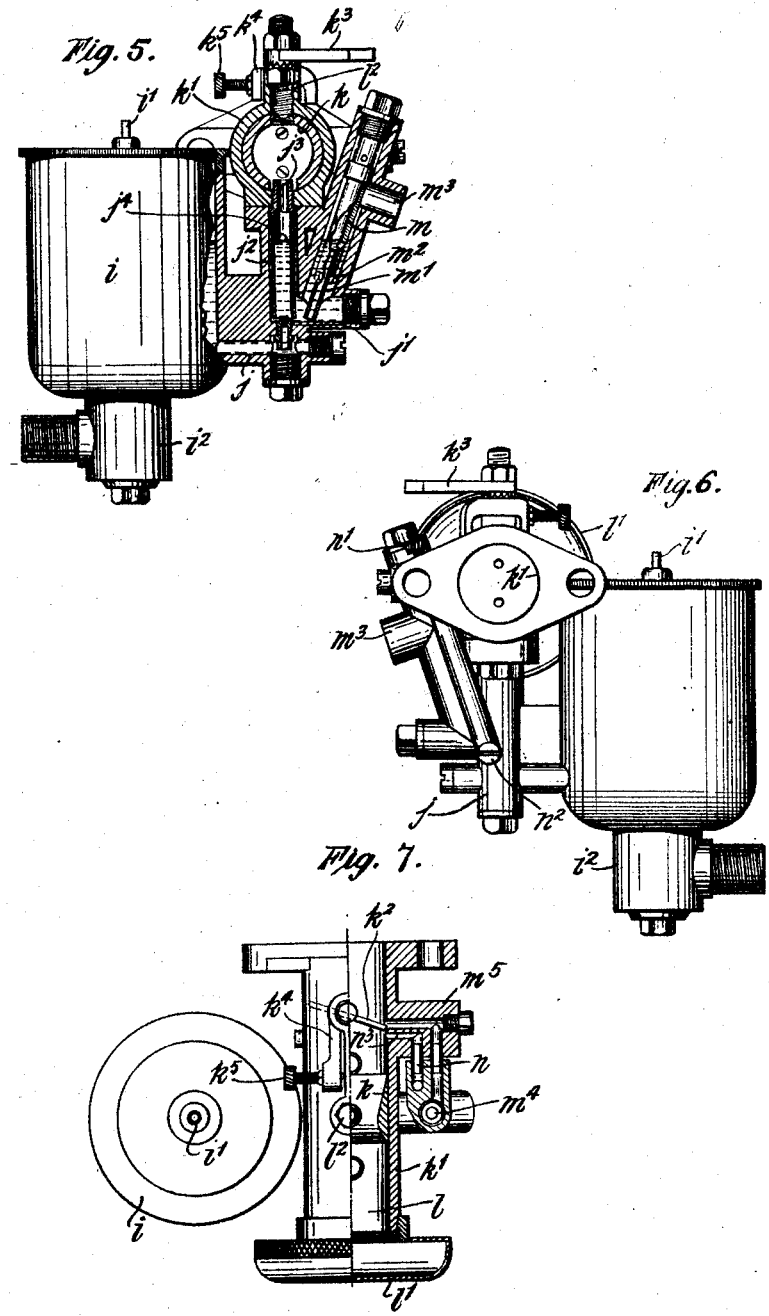

Patented June 16, 1925.

1,542,168

UNITED STATES PATENT OFFICE.

ARCHIE DONALD PATERSON AND MALCOLM ALLAN GRAY, OF LONDON, ENGLAND; SAID GRAY ASSIGNOR TO SAID PATERSON.

CARBURETOR.

Application filed November 16, 1922. Serial No. 601,350.

*To all whom it may concern:*

Be it known that we, ARCHIE DONALD PATERSON and MALCOLM ALLAN GRAY, residing at London, England, subjects of the King of Great Britain and Ireland, have invented certain new and useful Improvements in Carburetors, of which the following is a specification.

This invention relates to carburetors and the primary object is to provide novel compensating means for obviating what is known as "flat spot", which is a phenomenon occurring at periods in most carburetors provided with means for supplying, in addition to the mixture of fuel and air supplied by the main nozzle, a rich mixture for starting and slow running purposes in advance of the throttle valve.

Such "flat spot" is due to the fact that on opening the throttle to admit the main charge of mixture, the suction of the engine does not create sufficient vacuum to cause a charge of correct proportions to issue from the main nozzle; while it also dilutes the slow running mixture suddenly or to too great an extent.

Now the present invention, broadly stated, consists in causing a charge of liquid fuel only, undiluted by any addition of air to issue at low engine speeds into the induction pipe or mixing chamber or equivalent at a point adjacent the point of issuance of the starting or slow running charge or mixture, but on the atmospheric side of the normal closed position of the throttle and as remote as possible from the main nozzle. This charge of undiluted fuel is drawn through a duct, the cross sectional area of which may be adjusted or calibrated to suit various requirements of the engine to which the carburetor is applied, and issues into the induction pipe under a high suction, whereby there is provided at that point and at slow engine speeds a charge which will, so to speak, properly bridge the gap between the usual starting charge of fuel mixed with air and the main charge and thus overcome the objectionable "flat spot" referred to.

The invention further comprises the novel features of construction, arrangement and combination of parts as hereinafter fully described and specifically pointed out in the appended claim with reference to the accompanying drawings, in which, Fig. 1 is a diagram illustrating the principle of operation of the improved carburetor. Figs. 2 to 4 show one specific embodiment of the carburetor, Fig. 2 being a vertical section, Fig. 3 a plan view of Fig. 2. Fig. 4 a section on line 4—4 of Fig. 3; Figs. 5 to 7 show another specific embodiment, Fig. 5 being a vertical section; Fig. 6 being an elevation and Fig. 7 a half plan view, half section.

To first refer to the diagram (Fig. 1) which will clearly demonstrate the principle of the invention, the carburetor shown is known as the vented nozzle type, that is to say, it is provided with a well A normally filled with fuel to the level existing in the float chamber B, and from which well leads a pipe C supplying the slow running device D which receives, by preference, a supply of heated air as through inlet E for forming the starting mixture. Into said well also extends a duct, pipe or the like F through which the auxiliary charge of undiluted fuel is drawn to a point $F^1$ in the induction pipe or mixing chamber G nearest the atmospheric side of the throttle H at its closed position and close to the point $D^1$ at which the slow running mixture issues. The pipe F is provided with means shown at $F^2$ by which its bore can be adjusted to vary the quantity of liquid fuel passing therethrough for the purpose above stated.

The main nozzle I includes a calibrated orifice J normally submerged in the base of the well A, the orifice being of less capacity than that of the main nozzle so that air as well as fuel is drawn from the nozzle at high speed, but said nozzle however is of such diameter that the remainder of the well, from which lead the slow running supply to D, and the undiluted fuel through F, may be quickly refilled after being emptied in the normal operation of the carburetor.

The relatively large diameter of such orifice J and the advantage mentioned are permitted by the provision of an air tube K into which said orifice discharges, this tube extending to the main nozzle aperture I¹ and being provided in advance of said aperture with means for the supply of exterior air as at K¹, other air holes K² being provided in the nozzle I. By this means the main charge of fuel, to which air has been previously admitted in the air tube at K¹, issues from said tube to the Venturi tube L in the form of an emulsion prior to its admixture with the main air supply admitted to said Venturi tube at intake M.

Such double dilution of the main charge and its consequent economy of fuel are rendered possible by the provision of the aforesaid auxiliary charge of undiluted fuel through F, F¹ at the period of slow engine speed, which will thus provide a means of gradually regulating the charge at the varying degrees of suction as the engine picks up speed, since it provides in the induction pipe G a rich mixture for starting and slow running, and immediately the throttle H is opened the excess air coming through the main air intake M mixes with the undiluted fuel issuing from its duct at F¹ and bridges the gap between I¹ and F¹. The said starting and slow running charge is followed by a more attenuated mixture as the main nozzle comes into operation, the two former supplies through F, F¹ and D, D¹ being automatically cut out by reason of the well A becoming empty. There is thus produced a regulation of the charge preventing the formation of a "flat spot" between the slow running device D and the main nozzle at I¹.

To now turn to the specific constructions of carburetors embodying the improvements operating on the principle outlined above, Figs. 2 to 4 show a construction of vertical carburetor comprising a float chamber $a$ with needle valve $a^1$ and usual fuel filter assembly $a^2$; this float chamber communicating through a calibrated plug $b$ with the well $c$ in which is located an air tube $d$ screwed into the open end of the well. From the well adjacent the air tube leads another air tube $d^1$ having air apertures at $d^2$ and surrounded by an air-sleeve $d^3$ in the path of air from the main cold air intake $d^4$. The air tube $d^1$ terminates above in the nozzle $e$ within the Venturi tube $e^1$ which is shown as provided with the usual adjusting plug $e^2$ and located, as commonly practised, in induction pipe $e^3$ below the throttle $f$. Said throttle is provided with a regulator and adjustment screw $f^1$ and is operated through lever $f^2$, the movement of which latter is controlled by a stop $f^3$.

As shown more particularly in Fig. 4 there also extends from the well $c$ a pipe $g^1$ leading to the slow-running device $g$, this pipe being adjustable as to height in said device and secured in position of adjustment by means of a lock-nut $g^2$. The slow running device itself is of any ordinary or appropriate construction and the slow running mixture, which may include heated air admitted at $g^3$ passes through the duct $g^4$ to the induction pipe adjacent the throttle as customary. It will also be seen that from the well $c$ there leads a channel $h$ for the undiluted fuel, and for the sake of brevity this channel may be termed an "accelerator duct" provided with an adjustment screw $h^1$ to control the amount of fuel passing to discharge duct $h^2$, which leads into the induction pipe at the point designated $h^3$ in Fig. 2.

In the embodiment illustrated in Figs. 5 to 7 a horizontal type of carburetor is shown also constructed to operate on the principle previously described, and comprising a float chamber $i$ with needle valve $i^1$ and fuel filter assembly $i^2$. The well $j$ leading from the float chamber $i$ contains the calibrated plug $j^1$, which is screwed into an aperture in the bottom of the well in alignment with the air tube $j^2$ terminating above in the nozzle $j^3$ and to which air is supplied through the port $j^4$. The nozzle $j^3$ discharges into the Venturi tube $k$ located in the horizontal induction pipe $k^1$ containing the throttle $k^2$, which is operated by the lever $k^3$ and is provided with the stop and adjustment screw $k^4$ and $k^5$ respectively. The cold air inlet to the induction pipe is shown at $l$ provided with a shield $l^1$ and the usual Venturi tube plug at $l^2$. The slow running mixture device $m$ is inclined to the axis of the main nozzle, and the adjustable pipe or duct $m^1$ of this device dips at its lower end into part of the well $j$ and is held in required position of adjustment by a lock nut $m^2$. Heated air may be supplied to said slow running device through the connection $m^3$ and the duct $m^4$ for the slow running mixture discharges into the induction pipe adjacent the throttle as shown at $m^5$ (Fig. 7).

The auxiliary fuel supply through the accelerator duct $n$ passes alongside the slow running mixture, there being provided at the top a regulating or adjusting screw $n^1$ for said duct, and below a plug $n^2$. The discharge $n^3$ from said duct passes into the induction pipe in advance of the throttle, as shown in Fig. 7.

What we claim as our invention and desire to secure by Letters Patent of the United States is:

In a carburetor, the combination, with a constant-level chamber, a mixing chamber, a throttle valve therein, a main nozzle discharging into the mixing chamber, and a secondary device for supplying starting or slow-running mixture also discharging into the mixing chamber; of means for supplying an auxiliary charge of undiluted liquid fuel into said mixing chamber at small throttle openings, said auxiliary charge being delivered at a point adjacent the point of discharge of said starting mixture into the mixing chamber and also adjacent the closed position of the throttle on the atmosphere side thereof; and a well with which the main nozzle, the starting supply device and the auxiliary fuel supply means communicate, the main nozzle communicating with said well at a lower level than the auxiliary fuel supply means.

In witness whereof we have signed this specification.

ARCHIE DONALD PATERSON.
MALCOLM ALLAN GRAY.